United States Patent [19]

Kotani

[11] 4,294,463
[45] Oct. 13, 1981

[54] COLLAPSIBLE LUGGAGE CARRIER

[76] Inventor: Hirotaro Kotani, No.2-4, Ayameike-cho Minami-6-chome, Nara-shi, Nara-ken, 631, Japan

[21] Appl. No.: 83,368

[22] Filed: Oct. 10, 1979

[51] Int. Cl.³ .............................................. B62B 1/00
[52] U.S. Cl. ................................ 280/646; 150/1.5 B; 224/257; 280/655; 280/47.29
[58] Field of Search ................... 280/35, 638, 639, 37, 280/38, 39, 40, 641, 645, 646, 651, 652, 654, 655, 659, 47.13 R, 47.17, 47.18, 47.27, 47.29, 1.5; 150/1.5 R, 1.5 B; 248/96, 97, 98; 224/257, 258, 150, 157

[56] References Cited

U.S. PATENT DOCUMENTS

| | | | |
|---|---|---|---|
| 2,858,140 | 10/1958 | Stamp | 150/1.5 B X |
| 2,982,455 | 5/1961 | Rosen | 150/1.5 B X |
| 3,197,226 | 7/1965 | Erlinder | 280/646 |
| 3,612,563 | 10/1971 | Kazmark, Sr. | 280/79.1 X |
| 3,937,485 | 2/1976 | Shouyek et al. | 280/35 |

FOREIGN PATENT DOCUMENTS

| | | |
|---|---|---|
| 2745177 | 4/1978 | Fed. Rep. of Germany . |
| 1509040 | 12/1967 | France ................................ 280/655 |

Primary Examiner—Joseph F. Peters, Jr.
Assistant Examiner—Donald W. Underwood
Attorney, Agent, or Firm—Armstrong, Nikaido, Marmelstein & Kubovcik

[57] ABSTRACT

A collapsible luggage carrier being pulled along behind the user rolling on two wheels. So as to possess outstanding portability along with universal usefulness as a transport device the carrier is provided with a spacious base platform frame comprising two X-shaped frames laterally arranged and pivotally connected together, a back frame comprising a telescopic handle bar and a pair of links connected thereto and being pivotally connected to the base platform frame at three equidistant portions in lateral alignment, expanding members, for holding both the frames in their laterally expanded state, and none of rigid side assemblies disposed to opposite sides of the carrier. The both frames are unfoldable at a right angle with each other and each foldable over the other. The frames are laterally expansible and collapsible with each other. The carrier is collapsible into the form of a compact, short and slender bundle without disassembly.

11 Claims, 13 Drawing Figures

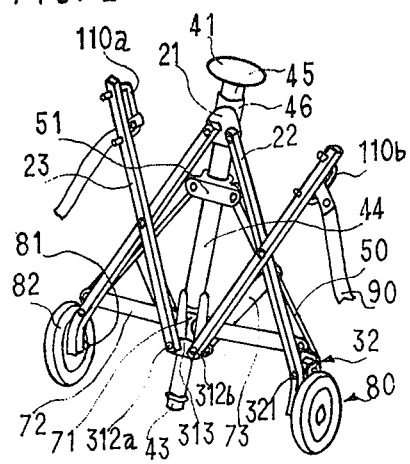
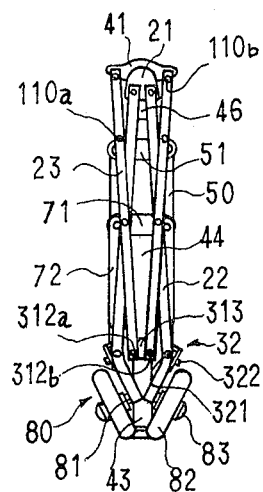
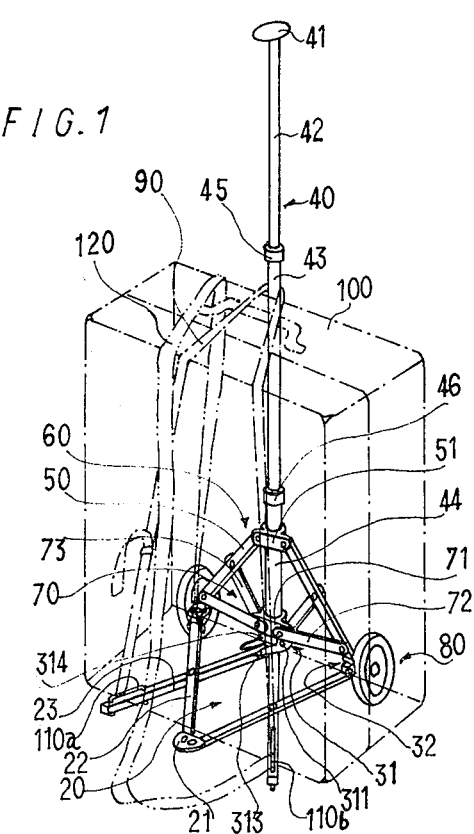
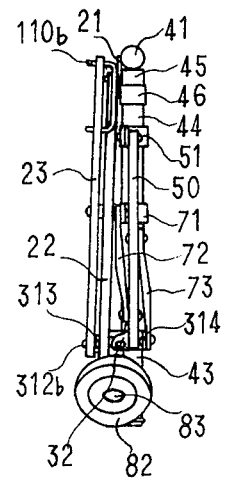

COLLAPSIBLE LUGGAGE CARRIER

BACKGROUND OF THE INVENTION

1. Field of the Invention

This invention pertains to portable luggage carrying devices which can be folded or collapsed into a compact unit. The carrying device is pulled along behind the user rolling on two wheels and is adapted to transport easily even a plurality of bags, boxes or other similar articles.

2. Description of the Prior Art

Some devices of this type are known which are portable as collapsed in the form of a bundle, but the known devices involve problems attributable to the inherent structure thereof. Kazmark U.S. Pat. No. 3,612,563 (1971), for example, discloses a carrier which can be compacted to the form of a bundle when disassembled. This carrier is cumbersome to handle since the carrier must be disassembled, or conversely assembled for use. The device includes a suitcase support bracket of extremely small depth so as to be portable in a compact form. The device is unable to satisfactorily support a luggage of low rigidity because the bottom portion of the luggage is supported predominantly by a restraining strap. Since the luggage is placed on the support bracket with its center of gravity positioned outside the bracket because of the small depth, the handle bar is likely to forwardly fall down. Since the carrier has the support bracket as an elongated horizontal beam disposed outside two wheels diametrically outwardly thereof for supporting the wheels, the wheels remain projected when the carrier is in its folded state, hence bulky.

Shourek et al. U.S. Pat. No. 3,937,485 (1976) discloses a simple construction which, nevertheless, has inherent problems; a back portion or luggage support portion comprises a pair of telescopic tubular members which are difficult to hold in balance with each other when stretched, and the support portion fails to support the luggage with stability because it is triangular.

Kotani West German Laid-Open pat. application No. 27 45 177 discloses a carrier comprising a luggage support frame, a back frame and a pair of side assemblies provided on opposite sides of the carrier being adapted to hold both the frames approximately at a right angle with each other in an unfolded position, each of the side assemblies including a flexible slanting brace having one end connected to a front portion of the luggage support frame and the other end connected to a lower portion of the back frame. When the carrier is loaded with a luggage of poor rigidity, a flexible strap extending from a handle bar in the upper portion of the back frame to the front portion of the support frame is tightened up to restrain the luggage. The slanting braces then act against the restraining action of the taut strap, consequently subjecting the handle bar and the lower portion of the back frame to forces acting in opposite derections and causing damage to the back frame structure. Furthermore the carrier is unable to support luggages with a width larger than the entire width of the carrier due to the presence of the slanting braces. The proposed device therefore is not fully useful as a portable luggage carrier which must be usable for luggages of various character.

The prior art devices described above have problems in common. Although most of the luggages to be transported by the carriers of the type described are heavier than can be carried by hand, the carriers have no means whatever for overcoming the difficulties to be encountered in transport when they become unserviceable as wheeled devices in the course of transport. Whereas it has long been desired that the carrying devices of this type have outstanding portability along with various well-balanced useful features including the above-mentioned means and assuring a smooth transport operation, the known devices still remain to be improved in this respect.

SUMMARY OF THE INVENTION

The present invention provides a unique two-wheeled luggage carrier made mainly of metal members and having both outstanding portability and a high degree of usefulness as a transport device.

The novel luggage carrier includes a base platform frame in the form of a relatively compact lattice-like structure consisting mainly of four links which are pivotally connected together. The base platform frame is laterally expansible and collapsible and has a wide area of sufficient lateral width and depth for supporting luggage in a horizontal position when the carrier is to be loaded. The carrier further includes a back frame having a lattice-like lower portion and comprising a collapsible handle bar and a pair of links each pivotally connected to the other at one end and connected to the handle bar at the connected ends, the pair of links being angularly expansible and collapsible. The back frame is pivotally connected to the base platform frame at three portions which are substantially in alignment at all times. The back frame is laterally expansible and collapsible with the base platform frame. The back frame is unrestrictedly foldable over the base platform frame and unfoldable to a position at least at a right angle with the base platform frame without provision of any side assemblies like that of the prior art mentioned before. The carrier further includes expanding means for retaining both the frames in shape when the frames are laterally expanded. The carrier includes a pair of wheels arranged the rear of the pivotally connected portions of the frames and having a large tread.

Without disassembling, the carrier is foldable into a short compact bundle by collapsing the handle bar, folding one frame over the other and laterally folding both the frames in operative relation with each other, in whatever order these components are collapsed or folded.

The carrier may be provided with a flexible suspending strap for use on the shoulder or by the hand to suspend the base platform frame as a support and carry luggage as along a staircase. The suspending strap has one end connected approximately to a front portion of the base platform frame and the other end connected approximately to a portion of the base platform frame wherever distant from the front portion of the base platform frame.

An object of this invention is to provide a luggage carrier which is lightweight, highly portable and foldable into a very small compact shape.

Another object of the invention is to provide a luggage carrier which is usable for luggages of poor rigidity free of any troubles.

Another object of the invention is to provide a luggage carrier which is universally usable for luggages of unlimited varying lateral widths.

Another object of the invention is to provide a luggage carrier provided with wheels of large diameter without having adverse effect on its portability.

Another object of the invention is to provide a luggage carrier having outstanding stability against rolling.

Still another object of the invention is to provide a luggage carrier which involves no difficulty in transporting luggages even on staircases.

These and other objects of the invention will become apparent from the following description, attached drawings, and appended claims.

BRIEF DESCRIPTION OF THE DRAWINGS

FIG. 1 is a perspective view showing an embodiment of the luggage carrier of this invention in its fully unfolded position;

FIG. 2 is a perspective view showing the embodiment of FIG. 1 as it is being collapsed;

FIG. 3 is an elevational view showing the embodiment of FIG. 1 in its completely collapsed state;

FIG. 4 is a side elevation of the same;

DESCRIPTION OF THE PREFERRED EMBODIMENTS

Figure 5:
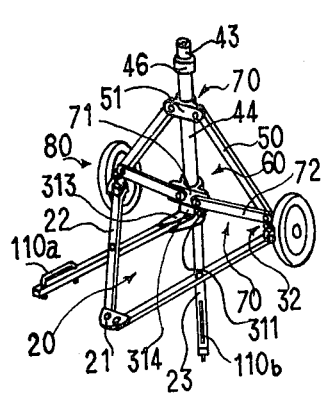
FIGS. 5 to 10 are perspective views showing other embodiments of the invention in their fully unfolded state with part of a handle bar omitted.

Referring to the attached drawings and in particular to the perspective view of FIG. 1, there is shown a luggage carrier of the present invention including a base platform frame 20 for receiving in its horizontal position a luggage 100 for transport, a back frame 60 including a handle bar 40, expanding means 70 and a pair of wheel members 80. Stated more specifically with reference to FIGS. 1 to 4, the base platform frame 20 comprises a pair of first links 22 each pivotally connected to the other at one end by a first connecting member 21 and angularly expansible and collapsible, and a pair of second links 23 each pivoted to the mid-portion of one of the first links 22 approximately at one end thereof intersecting the first link 22. The second links 23 are pivotally connected to each other at the other end thereof by first hinge means 31 and are angularly expansible and collapsible. The base platform frame 20 is laterally foldable and unfoldable. The second link 23 includes an extension extending from its end portion pivoted to the first link 22. The base platform frame 20, when in its laterally unfolded state, has a shape resembling two X-shaped frames connected together as arranged side by side. This frame will hereinafter be referred to as a "double X-frame". Although the base platform frame of this invention is not limited to the double X-frame, use of the double X-frame gives the base platform frame an increased effective luggage support area and enhanced stability when supporting the luggage while assuring the advantage that a luggage restraining strap 90 can be attached to a front portion of the frame 20 at two spaced opposite locations as will be described later.

The handle bar 40 is pivotally connected at its lower portion to the ends of the pair of second links 23 by the first hinge means 31 which ends are pivotally connected to each other. The handle bar 40 has a handle member 41 at its upper portion. The handle bar 40 comprises the above-mentioned handle member 41, an upper rod 42, a tubular intermediate rod 43 having a larger diameter than the upper rod 42, a tubular lower rod 44 having a larger diameter than the intermediate rod 43, and known fixing members 45 and 46 for fixing the rods in an extended state. The handle bar 40 is telescopically collapsible and serves as a lever for handling the carrier. A pair of third links 50 are pivotally connected, each at its one end, approximately to the free ends of the first links 22 by second hinge means 32 and have the other ends pivoted to a first sliding member 51 slidably fitting around the lower rod 44, whereby the pair of third links 50 are pivotally connected to each other. The third links 50 are connected to the handle bar 40 by the first sliding member 51 and are angularly expansible and collapsible. The handle bar 40 and the pair of third links 50 provide the back frame 60, which is unfoldable to a position at least at a right angle with the base platform frame 20, foldable over the frame 20, and per se laterally expansible and collapsible with the frame 20 in its folded position. The back frame 60 is pivotally connected to the base platform frame 20 at three locations by the first hinge means 31 and the pair of second hinge means 32.

Each of the first and second hinge means 31 and 32 functions as pivotal movement for folding and unfolding both the frames 20 and 60 relative to each other and is provided with movement compensating means for compensating for the lateral expanding or collapsing movement of the frames 20 and 60 so as to be serviceable as the pivotal movement. The movement compensating means for the first hinge means 31 compensates for the expanding or collapsing movement of the pair of the second links 23 relative to each other, while the movement compensating means for the second hinge means 32 compensate for the expanding or collapsing movement of the pair of first links 22 relative to each other as well as that of the pair of third links 50 relative to each other, the pair of links being so movable in operative relation with each other.

The first hinge means 31 in the embodiment of FIG. 1 is a pivot joint having a hinge pivot 311 for unfolding the frames 20 and 60 relative to each other and two pivots 312a and 312b extending in the direction of the pivot for forming the base platform frame 20. The pivot joint comprises a bifurcate member 313 pivoted at its lower portion to the pair of second links 23 by the pivots 312a, 312b and having two forwardly projecting luggage support arms at the same level as the first links 22, a member 314 fixedly fitting around a lower portion of the lower rod 44 and pivoted to the member 313 by the pivot 311, and the three pivots 311, 312a, 312b. The two pivots 312a, 312b serve as the movement compensating means of the first hinge means 31.

Figure 11:
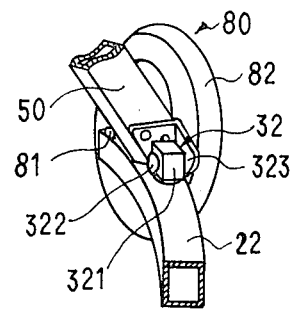
FIG. 11 is a fragmentary perspective view on an enlarged scale showing an embodiment of second hinge means.

The second hinge means 32 shown in FIG. 1 is illustrated in FIG. 11 in greater detail. The second hinge means 32 is a two-pivot joint having a pivot 321 in the direction of the pivot for forming the base platform frame 20 and a hinge pivot 322 for unfolding or folding the frames 20 and 60. The pivot 321 is fitted in a bore (not shown) extending vertically through the first link 22 and is turnably attached to the first link 22. The pivot 322 is fixedly or turnably attached to the pivot 321 at right angles therewith. A bracket 323 secured to the lower end of the third link 50 is supported by the pivot 322 turnably about the axis of the pivot 322. When the frames 20 and 60 are in the unfolded position substantially at a right angle with each other, the lower end of the third link 50 is in contact with the upper surface of the first link 22 at a position obliquely below the pivot 322 to the rear thereof, the second hinge means 32 thus preventing excess unfolding of the frames 20 and 60. The pivot 321 serves as the aforementioned movement compensating means. When the second hinge means 32 are used, the frames 20 and 60 are laterally expansible or collapsible only after having been folded to overlie each other. Another embodiment of the second hinge means may appear as a known ball joint (not shown).

The expanding means 70 comprises a second sliding member 71 slidably fitting around the lower rod 44 and positioned below the first sliding member 51, and a pair of fourth links 72 each having one end pivoted to the second sliding member 71 and the other end pivoted to one of the third links 50 near the position where the third link 50 is pivotally connected to the first link 22. The pair of fourth links 72 are angularly expansible and collapsible. The second sliding member 71 and the fourth links 72 provide a toggle joint for coupling the pair of third links 50 to the lower rod 44. The expanding means 70 further includes a pair of fifth links 73 each having one end pivoted to the lower portion of the lower rod 44 by the member 314 and the other end pivoted to the midportion of one of the third links 50, the pair of fifth links 73 being angularly expansible and collapsible. Accordingly the expanding means 70 comprises the toggle joint and the pair of fifth links 73. When both the frames 20 and 60 shown in FIGS. 1 and 2 are in a completely laterally expanded position, the second sliding member 71 is prevented from moving further downward by contact with the top end of the member 314 and also prevented from moving upward since the pair of fourth links 72 slightly project downward at their inner ends. In this state, the pair of third links 50 are prevented by the toggle joint from collapsing laterally toward the lower rod 44. At the same time, the first sliding member 51 is unable to slide on the lower rod 44 due to the presence of the pair of the fifth links 73. At this time, therefore, the structure provided by the third links 50 and the lower rod 44 is capable of retaining its shape independently without being restrained by the base platform frame 20 in its folded position over the frame 20. In other words, the structure can properly remain in shape also when the frames 20 and 60 are in the substantially right angle unfolded position for use. Furthermore the base platform frame 20 is also locked in its laterally expanded position by the third links 50 and the lower rod 44.

The present device is collapsible from the state of FIG. 1 to the state of FIGS. 3 and 4 by collapsing the handle bar 40 and folding the frames 20 and 60 over each other first to the state of FIG. 2, and further slidingly moving the second sliding member 71 upward to thereby angularly collapse the pair of fourth links 72 and laterally collapse the frames 20 and 60 with the sliding movement. Thus the device is foldable into a short compact bundle as seen in FIGS. 3 and 4. At this time, the upper rod 42 and the intermediate rod 43, which are longer than the lower rod 44, project beyond the lower end of the lower rod 44 to the position of the lower ends of the wheel members 80. The longer rods 42 and 43 render the carrier shorter than otherwise in the folded state, provided that the handle bar 40 in its stretched state has a given length.

Each of the wheel members 80 comprise an axle 81 fixed to a bent end portion of the first link 22 to the rear of the position where the third link 50 is pivotally connected to the first link 22 and extending outward from each side of the carrier, a wheel 82 and a retainer 83 for holding the wheel 82 on the axle 81. The pair of wheels 82 are rotatably mounted on the first links 22 to the rear of the position where the third link 50 is pivotally connected to the first link 22. The wheels 82 are also mounted on the first links 22 so as to be positioned on the lateral side portions of the links 22 when the base platform frame 20 is in a horizontal position. Each of the former and latter arrangements of the wheel 82 relative to the corresponding first link 22 is a requisite condition not only for ensuring increased compactness but also to prevent the load of luggage on the base platform frame 20 from giving a rightward or leftward torsion to the first link 22, regardless of whether the base platform frame is horizontal or in an inclined position as will be described later. In the folded state shown in FIGS. 3 and 4, the wheels 82 will not largely project outward beyond the contours of the folded bundle but can be compacted into the bundle substantially along its contours. The former arrangement of the wheel 82 can hold back large projections of the wheels 82 at right and left sides of the bundle in FIG. 3. Furthermore the latter arrangement of the wheel 82 can hold back large projections of the wheels 82 either at right side or at left side of the bundle in FIG. 4. Accordingly wheels of large diameter are usable without having adverse effect on the portability of the device. Larger wheels are more smoothly rollable over rough road surfaces.

The construction in which the wheels 82 are attached to the first links 22 permits the back frame 60 to retain a substantially upright position before or after loading without being adversely affected by the load of the luggage 100 on the base platform frame 20. The former arrangement of the wheels 82 enables the three pivotally connected portions of the frames 20 and 60 to turn upward about the axles 81 when the base platform frame 20 moves from a horizontal position to an inclined position for transport, with the result that the bottom portions of the three pivotally connected portions can be positioned at a greater distance from the road surface during transport than when the base platform frame 20 is in its horizontal position. The arrangement is therefore advantageous in that the bottom portions can be completely prevented from contacting the road surface even if there are irregularities on the road surface, thus assuring smooth travel of the carrier. Further when the former and latter arrangements of the wheels 82 are adopted in combination, the former arrangement of the wheels 82, which permits the wheels 82 to be mounted on the first links 22 to the rear of the second hinge means 32, prevents the luggage 100 on the carrier from coming into contact with the wheels 82 to interfere with the rotation thereof.

As will be apparent from the position of the wheels 82 relative to the first links 22 shown in FIG. 3, each of the wheels 82 is attached to the lateral side portion of the corresponding first link 22 at the position where, when the base platform frame 20 is in its horizontal position, the vertical line through the center point of the ground engaging surface of the wheel 82 generally intersects the longitudinal center line of the luggage supporting portion of the first link 22, so that the wheel 82 is almost free of the force which will act unevenly thereon toward either side thereof and bring down the wheel under the load of the luggage, regardless of whether the base platform frame is horizontal or in an inclined position during transport. Thus the arrangement of the wheels 82 enables the first links to retain a stable position with ease without being subjected to a rightward or leftward torsion.

The former arrangement of the wheels 82 is essential in the case stated above, because if the wheels 82 is mounted on the first link 22 at a location in front of the pivotally connected portion between the first and third links 22 and 50, it becomes difficult for the longitudinal center line of the luggage supporting portion of the first link 22 to intersect the above-mentioned vertical line of the wheel 82.

The latter arrangement of the wheels 82 is also critical in the case, because if the wheel 82 is disposed under the first link 22, the above center line of the first link 22 will move away from the vertical line a great distance when the base platform frame 20 shifts from the horizontal position to the inclined position for transport, thus entailing an increased likelihood that the two lines will not intersect with each other.

Because the wheel arrangement described overcomes the difficulties to be encountered in attaching the wheel members to the carrier structure of this invention due to the high structural independency of the components of the structure, the arrangement is one of the features supporting the present invention, while permitting the use of light members for various components including the first links 22 in view of the strength and weight ratios involved.

Indicated at 90 is a flexible luggage restraining strap extending from the handle bar 40 approximately to a pair of opposed ends of extensions of the second links 23. The strap 90 is tensioned between the base platform frame 20 and the handle bar 40 in an inverted V-shape to fasten the luggage 100 to the frames 20 and 60. The strap 90 has one end attached to an arch member 110$a$ fixed to a portion of one of the second links 23 close to its extended end and the other end connected to a similar arch member 110$b$ on the other second link 23. Since the luggage 100 is fastened to the frames 20 and 60 with the laterally spaced apart two portions of the strap 90, the luggage 100 can be restrained in position with stability free of inclination toward either side despite the shape of the handle bar 40. The arch member 110$a$ and 110$b$ enable the second links 23 to support the bottom of the luggage 100 at the same level as the first links 22 and have downwardly projecting ends which serve as ground engaging portions for the base platform frame 20. When the strap 90 is tightened up, the three members of the strap 90 and both the frames 20 and 60 provide a rigid structure surrounding the luggage 100. Both the frames 20 and 60 are held in its substantially right-angled unfolded position in pressing contact with the bottom and rear sides of the luggage 100 respectively, while the strap 90 is also serviceable as a structural member for holding the frames 20 and 60 in this position. Each of the frames 20 and 60, in a substantially right-angled position, reinforces the other in a direction at right angles with the plane of the other frame, thus providing a three-dimensionally rigid structure for supporting the luggage on the pair of wheel members 80.

Since the first hinge means 31, like the aforementioned pair of second hinge means 32, may be provided with the faculty to prevent the frames 20 and 60 from excessive unfolding, the luggage can then be transported in an inclined position as supported on the carrier with the frames 20 and 60 in their right-angled unfolded position even in the absence of the restraining strap 90. However, it is preferable to provide the restraining strap, in which case the strap will cooperate with the first and second hinge means to perform a dual function, thus fully preventing the excessive unfolding of the frames 20 and 60.

The present carrier is provided with none of side assemblies including the slanting braces which are disposed on the opposite sides of the carrier of the prior art mentioned before for holding the frames 20 and 60 in their substantially right-angled unfolded position, so that the back frame 60 will not be subjected to a destructive force by the tension of the restraining strap even when supporting a luggage of poor rigidity, unlike the case in which the slanting braces are used, since the frames 20 and 60 are unfoldable to the desired angle in accordance with the shape of the luggage. Further the present carrier can be loaded with luggages having lateral widths exceeding the entire width of the carrier. The absence of the side assemblies makes the carrier correspondingly simpler, accordingly lighter and foldable into a bundle of slenderer size and is therefore very useful for assuring improved portability and reduced manufacturing cost.

Figure 13:
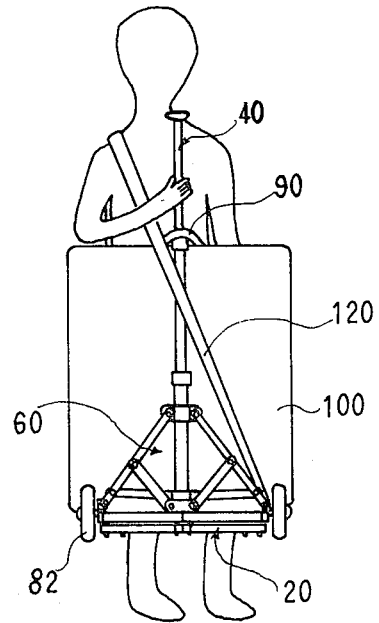

Indicated at 120 is a suspending strap having one end connected to the arch member 110$b$ and the other end connected to the first link 22 in parallel to the second link 23 having the arch member 110$b$, in the vicinity of the position where the third link 50 is pivotally connected to the first link 22. The strap 120 is so disposed that when the carrier is suspended from the strap 120 and seen vertically from thereabove, the strap 120 will approximately equally divide the base platform frame 20. Accordingly when the carrier is suspended from the strap 120 with the luggage 100 placed on the base platform frame 20 serving as a support, the luggage 100 is retainable substantially in place with its weight entirely supported by the strap 120. The luggage and the carrier can be transported in suspension smoothly and easily merely by lightly holding an upper portion of the handle bar 40 by hand to keep them in balance and to retain the luggage in place more effectively against slight inclination. FIG. 13 shows the luggage and the carrier as suspended from the shoulder with the strap 120 during transport. This mode of transport leads to savings in labor and facilitated walking on staircases.

Figure 6:
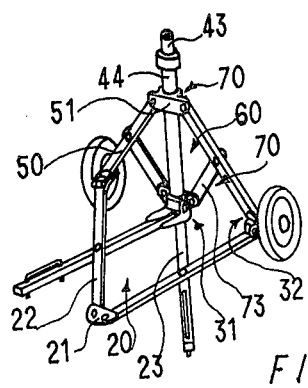
Figure 7:
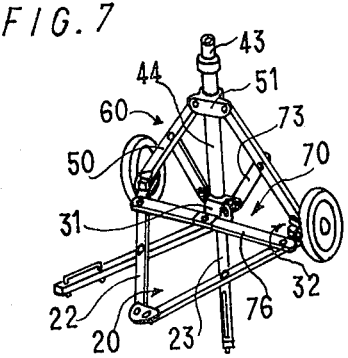
Figure 12:
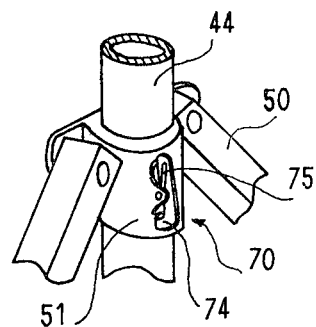
FIG. 12 is a perspective enlarged view showing locking means in the embodiments of FIGS. 5 and 6; and, FIG. 13 is an elevational view showing the carrier of FIG. 1 as loaded with a luggage and supported by the user in suspension for transport.

FIGS. 5 to 7 show other embodiments of the invention each of which differs from the embodiment of FIG. 1 in the expanding means. The expanding means 70 shown in FIG. 5 comprises the aforementioned toggle joint and locking means provided on the lower rod 44 and the first sliding member 51 for locking the two members 44 and 51 relative to each other at a specified position. With reference to FIG. 12 showing an embodiment of the locking means, an engaging pawl 74 biased by a spring 75 is mounted on a rear portion of the first sliding member 51. The pawl 74 is engageable in a bore (not shown) formed in the desired portion of the lower rod 44, thus locking the member 51 to the rod 44.

The expanding means 70 of the embodiment of FIG. 6 comprises the foregoing pair of fifth links 73 and the locking means shown in FIG. 12.

The expanding means 70 of the embodiment of FIG. 7 comprises the aforementioned pair of fifth links 73 and a toggle bar 76 having one end pivoted to one of the first links 22 near the portion thereof pivotally connected to the third link 50 and the other end pivoted to the other first link 22 near the portion thereof pivotally connected to the other third link 50, the toggle bar 76 being angularly expansible and collapsible. The toggle bar produces the same effect as the toggle joint already described.

Figure 8:
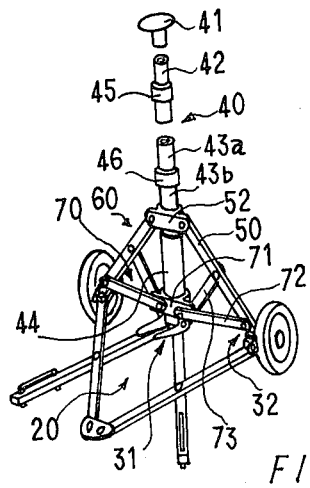
Figure 9:
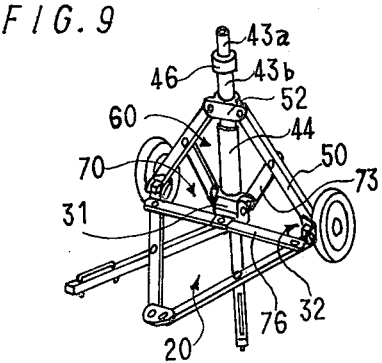

FIGS. 8 and 9 show two embodiments which differ from the foregoing embodiments in the construction of the back frame 60. With reference to the embodiment of FIG. 8, the intermediate rod of the handle bar 40 comprises two rods, i.e. an upper intermediate rod 43a and a lower intermediate rod 43b. The pair of third links 50 are pivoted each at its one end to a second connecting member 52 fixed to the lower intermediate rod 43b, whereby the links 50 are pivotally connected together and are also pivotally connected to the lower intermediate rod 43b by the second connecting member 52. The lower intermediate rod 43b and the lower rod 44 are telescopic, and the aforesaid fixing member is not provided therebetween.

The embodiment of FIG. 9, although having the same back frame 60 as the embodiment of FIG. 8, has different expanding means 70 from the embodiment of FIG. 8.

Figure 10:
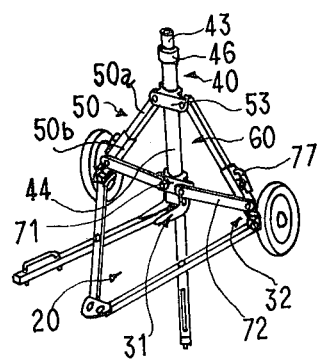

The embodiment of FIG. 10 differs from all the foregoing embodiments in the constructions of the back frame 60 and the expanding means 70. Each of the third links 50 comprises an upper member 50a and a lower member 50b which are telescopic. The pair of upper members 50a are pivoted at their upper ends to the lower rod 44 by a third connecting member 53 fixed to the lower rod 44. The expanding means 70 comprises locking means each provided on each of the third links 50 for preventing collapsing or stretching of the links at a specified position, and the foregoing toggle joint. The locking means provided on the third link 50 comprises an engaging pawl 77 provided on a side portion of the lower member 50b and biased by a spring (not shown) and a bore (not shown) for receiving the pawl 77 which bore is formed in a specified portion of the upper member 50a inserted into the lower member 50b. The embodiment of FIG. 10 may be so interpreted that the locking means in the embodiment of FIG. 5 is provided in each of the third links 50.

Dimensions of a trial product of the carrier of the invention will be described below. The product has the construction shown in FIG. 1 with wheels having a diameter of 7.5 cm. When completely folded in the state of FIGS. 3 and 4, the carrier measures 38×8×6.5 (10 for wheeled portion) cm. Thus the carrier has a surprisingly small size such that as compared with known foldable portable umbrellas, it is approximately equal in length and slightly thicker. The wheels have a diameter which is exceedingly large relative to the above-mentioned overall size of the carrier so that the wheels can easily roll over irregularities on usual road surfaces without producing noise. When fully unfolded and stretched to the state of FIG. 1, the carrier measures 98 cm. in overall height, 25 cm. in the depth of the base platform frame, 31 cm. in the lateral width of the same frame and 33 cm. in tread. The overall height is large enough for the user since it is calculated from the mean height of expected users based on human engineering. The base platform frame is dimensioned to provide a wide area for stably supporting even luggages of large bottom area. The tread is accomodated to road surface irregularities as well as to luggages of large width while assuring stability against rolling. For reference, the Shourek device which appears superior to the other prior art devices mentioned before in respect of compactness is 18 inches (about 46 cm.) in the dimension of the longest member and 36 inches (about 91 cm.) in the overall height of the device in its completely unfolded stretched state. A comparison between these dimensions and the foregoing dimensions of the present device will reveal that the carrier of the invention is foldable with outstanding compactness.

The trial product of the invention, made from aluminum alloy pipes, steel pipes, plastics moldings and other members, is as light as 900 g. including the luggage restraining and suspending straps. In addition to the high compactness, the present device has such thorough portability that the user can carry it with feeling free of any trouble. The maximum live load is about 40 kg. with a built-in safety factor.

The structure of the invention is totally free of the problem to be experienced in handling the Shourek device that it is difficult to hold the opposed handle bars in balance when stretched or collapsed. Whereas the present device is similar to the Shourek device in that the back portion and the luggage support portion are foldable both toward each other and laterally without the necessity of disassembling, the Shourek device, when having an increased tread relative to a definite overall height, will increase in the dimension of the longest member in its completely folded state since the back portion is triangular in its entirety. This is unlikely with the present invention because of the structure of the back frame. Accordingly the tread of the carrier of the invention can be increased sufficiently by increasing the unfolding angle between the pair of third links or by increasing the length of the third links without varying the overall height and the dimension of the longest member in the completely folded state. As a result, high stability against rolling can be ensured during use without any adverse influence on the portability. With stability thus assured, the carrier is prevented from lateral turnover and is easy to pull.

Despite the provision of the handle bar centrally extending through the carrier vertically thereof and the wide base platform frame of large depth and lateral width, the three pivot portions connecting the base platform frame and the back frame together can be substantially aligned at all times by being restrained by the base platform frame irrespective of the expansion or collapsing of the two frames. This gives the carrier high foldability in that the two frames are foldable in two directions except for the handle bar which is telescopically collapsible. The carrier is foldable to a compact slender portable bundle, therefore.

The lower portion of the back frame and the base platform frame are each ingeniously composed of a relatively large number of foldable links which can be effectively arranged as skeletal structural members when laterally expanded. When giving definite structural strength, this construction is lighter than frames of fewer links, designed to have higher strength relative to the weight as is the case with honeycomb core structures. Moreover the construction is foldable into a slenderer bundle and accordingly more advantageous in portability than such frames of fewer links.

While the prior art devices of the foregoing U.S. Patents are adapted mainly for use with suitcases and like rigid articles, the present device is usable not only for suitcases but also for articles of poor rigidity with high amenability without any likelihood of a break in the back frame, since the base platform frame and the lower portion of the back frame are in the form of a relatively compact lattice with large depth and height when in the expanded state. Since the present carrier is adapted for use with articles of large width such as large-sized suitcases, it has universal usefulness which is a very important feature of such portable carrier because the user is not always able to know in advance the particulars of the luggage to be transported, such as the size, shape, and rigidity. Further as already stated, the carrier of this invention can be unfolded, expanded and folded quickly and easily without the necessity of assembling or disassembling of the components, hence high handleability. With these advantages, the invention has overcome all the problems experienced with the foregoing prior art devices.

The arrangements of the wheels on the first links in the manner described above, as combined with the mechanism for laterally expanding or collapsing the two frames, renders the carrier foldable into a more compact and slenderer bundle than the prior art devices.

When the two frames are in an approximately right-angled unfolded position in the laterally expanded state, the base platform frame of wide area is reinforced in the direction along the handle bar by the back frame through the three pivoted portions and is suitably serviceable as a rigid support for supporting luggage in suspension with use of the suspending strap. With the use of the suspending strap, the present device has overcome the difficulties to be sometimes experienced in transporting luggages along staircases. This gives the device increased usefulness.

As described above, the luggage carrier of the invention has a well-balanced, highly improved, unique construction as a portable carrier when evaluated from various viewpoints. Thus the aforesaid objects of the invention can be fully fulfilled with outstanding advantages.

The foregoing description and drawings merely explain and illustrate the invention, and the invention is not limited thereto but is defined in the appended claims. Those skilled in the art will be able to make modifications and variations without departing from the scope of the invention.

What I claim is:

1. A portable luggage carrier collapsible into the form of a bundle comprising:
    a base platform frame including a pair of first links each pivotally connected to the other at one end and angular expansible and collapsible and a pair of second links each pivoted to the midporton of one of the first links approximately at one end portion of each second link intersecting said first link, the second links being pivotally connected to each other at the other ends thereof and being angularly expansible and collapsible, the base platform frame being adapted to receive luggage thereon for transport;
    a back frame including a collapsible handle bar pivotally connected at its lower portion to said other ends of the pair of second links and having the handle member at its upper portion and a pair of third links each pivotally connected approximately at one end portion thereof to a portion of one of the first links close to its free end and having the other ends pivotally connected to each other and also connected to the handle bar, the third links being angularly expansible and collapsible, the back frame being unfoldable to a position at least at a right angle with the base platform frame and foldable over the base platform frame, the back frame being laterally expansible and collapsible in operative relation with the base platform frame when folded over the base platform frame;
    first hinge means pivotally connecting the handle bar to the second links as pivotal movement for pivotally connecting the base platform frame to the back frame and provided with movement compensating means for compensating for the expanding or collapsing movement of the pair of second links relative to each other so as to be serviceable as the pivotal movement;
    a pair of second hinge means pivotally connecting the first links to the third links as said pivotal movement and provided with movement compensating means for compensating for the operatively related expanding or collapsing movement of the pair of the first links relative to each other and of the pair of the third links relative to each other so as to be serviceable as said pivotal movement, said back frame being pivotally connected to said base platform frame at no more than three locations by said first hinge means and said pair of second hinge means;
    expanding means for holding both the frames in a laterally expanded position and for permitting the back frame to independently retain the shape to which the back frame is expanded laterally along with the base platform frame as folded over the base platform frame, also when the back frame is in its unfolded position approximately at right angle with the base platform frame; and
    a pair of wheels being mounted at a first pivot on the first links to the rear of a second pivot position where the third link is pivotally connected to the first link, and so as to be positioned on lateral side portions of the first links when the base platform frame is in a horizontal position.

2. A portable luggage carrier as defined in claim 1 wherein the handle bar is telescopic and comprises an upper rod, at least one tubular intermediate rod having a larger diameter than the upper rod and a tubular lower rod having a larger diameter than the intermediate rod.

3. A portable luggage carrier as defined in claim 2 wherein the upper rod and the intermediate rod have a larger length than the lower rod so as to be projectable from the lower end of the lower rod when inserted into the lower rod.

4. A portable luggage carrier as defined in claim 2 wherein the third links are pivoted to a first sliding member slidably fitting around the lower rod.

5. A portable luggage carrier as defined in claim 2 wherein the third links are pivoted to the intermediate rod.

6. A portable luggage carrier as defined in claim 1 wherein each of the second links includes an extension extending from its end portion pivoted to the first link, and the base platform frame forms a double X-frame when laterally expanded.

7. A portable luggage carrier as defined in claim 6 wherein a flexible luggage restraining strap extends from the handle bar approximately to the ends of the extensions of the pair of second links and is in the form of an inverted V-shape between the handle bar and the base platform frame.

8. A portable luggage carrier as defined in claim 1 wherein the expanding means comprises a toggle joint and a pair of fifth links, the toggle joint comprising a second sliding member slidable on the handle bar below the position where the third links are connected by a first sliding member to the handle bar, and a pair of fourth links each having one end pivoted to the second sliding member and the other end pivoted to one of the third links near the position where the third link is pivotally connected to the first link, the pair of fourth links being angularly expansible and collapsible, the pair of fifth links each having one end pivotally connected to the lower portion of the handle bar and the other end pivoted to the midportion of one of the third links, the pair of fifth links being angularly expansible and collapsible.

9. A portable luggage carrier as defined in claim 1 wherein each of the wheels is so positioned that when the base platform frame is in its horizontal position, the vertical line through the center point of the ground engaging surface of the wheel approximately intersects the longitudinal center line of the luggage supporting portion of the first link.

10. A portable luggage carrier as defined in claim 1 wherein a flexible suspending strap has one end connected approximately to a front portion of the base platform frame and the other end connected approximately to a portion of the base platform frame wherever distant from the front portion of the base platform frame.

11. A portable luggage carrier as defined in claim 10 wherein when suspending the carrier and seen vertically from thereabove, the suspending strap is positioned to substantially equally divide the base platform frame.

* * * * *